(12) United States Patent
Godreau

(10) Patent No.: US 8,144,946 B2
(45) Date of Patent: Mar. 27, 2012

(54) METHOD OF IDENTIFYING SYMBOLIC POINTS ON AN IMAGE OF A PERSON'S FACE

(75) Inventor: Bertrand Godreau, Toulouse (FR)

(73) Assignee: Continental Automotive France, Toulouse (FR)

( * ) Notice: Subject to any disclaimer, the term of this patent is extended or adjusted under 35 U.S.C. 154(b) by 430 days.

(21) Appl. No.: 12/524,765

(22) PCT Filed: Dec. 5, 2007

(86) PCT No.: PCT/EP2007/010536
§ 371 (c)(1),
(2), (4) Date: Jul. 28, 2009

(87) PCT Pub. No.: WO2008/104208
PCT Pub. Date: Sep. 4, 2008

(65) Prior Publication Data
US 2010/0061639 A1 Mar. 11, 2010

(30) Foreign Application Priority Data
Jan. 30, 2007 (FR) ...................................... 07 00628

(51) Int. Cl.
*G06K 9/00* (2006.01)
(52) U.S. Cl. .......................... 382/118; 382/115; 382/117
(58) Field of Classification Search .................. 382/115, 382/117, 118, 162, 165, 167, 274; 348/78; 351/209, 210, 211, 212; 396/18, 51, 158
See application file for complete search history.

(56) References Cited

U.S. PATENT DOCUMENTS

| | | | | |
|---|---|---|---|---|
| 4,396,903 A | * | 8/1983 | Habicht et al. | 382/103 |
| 6,181,805 B1 | * | 1/2001 | Koike et al. | 382/118 |
| 6,711,293 B1 | | 3/2004 | Lowe | |

FOREIGN PATENT DOCUMENTS

| | | |
|---|---|---|
| WO | 90/14634 | 11/1990 |
| WO | 02/09025 | 1/2002 |

\* cited by examiner

*Primary Examiner* — Brian Le
(74) *Attorney, Agent, or Firm* — Young & Thompson

(57) ABSTRACT

A method for identifying symbolic points on the image of a face including images of a right eye, left eye and mouth, includes:
  detecting and identifying elements with strong contrasts such as the irises, nostrils, or mouth;
  selecting zones of the image with respect to the elements with strong contrasts including a priori two sought-after symbolic points interrelated by a morphological criterion;
  searching within the zones for natural points through the convergence of lines of the image and, for each natural point, determining a signature, determining a score with respect to pre-established signatures and selecting the natural points having a score above a threshold value;
  in each zone, identifying pairs of natural points and determining for each identified pair a score with respect to pairs of standard symbolic points and selecting the pair of natural points having the best score as symbolic points of the zone.

12 Claims, 2 Drawing Sheets

METHOD OF IDENTIFYING SYMBOLIC POINTS ON AN IMAGE OF A PERSON'S FACE

Figure 1:
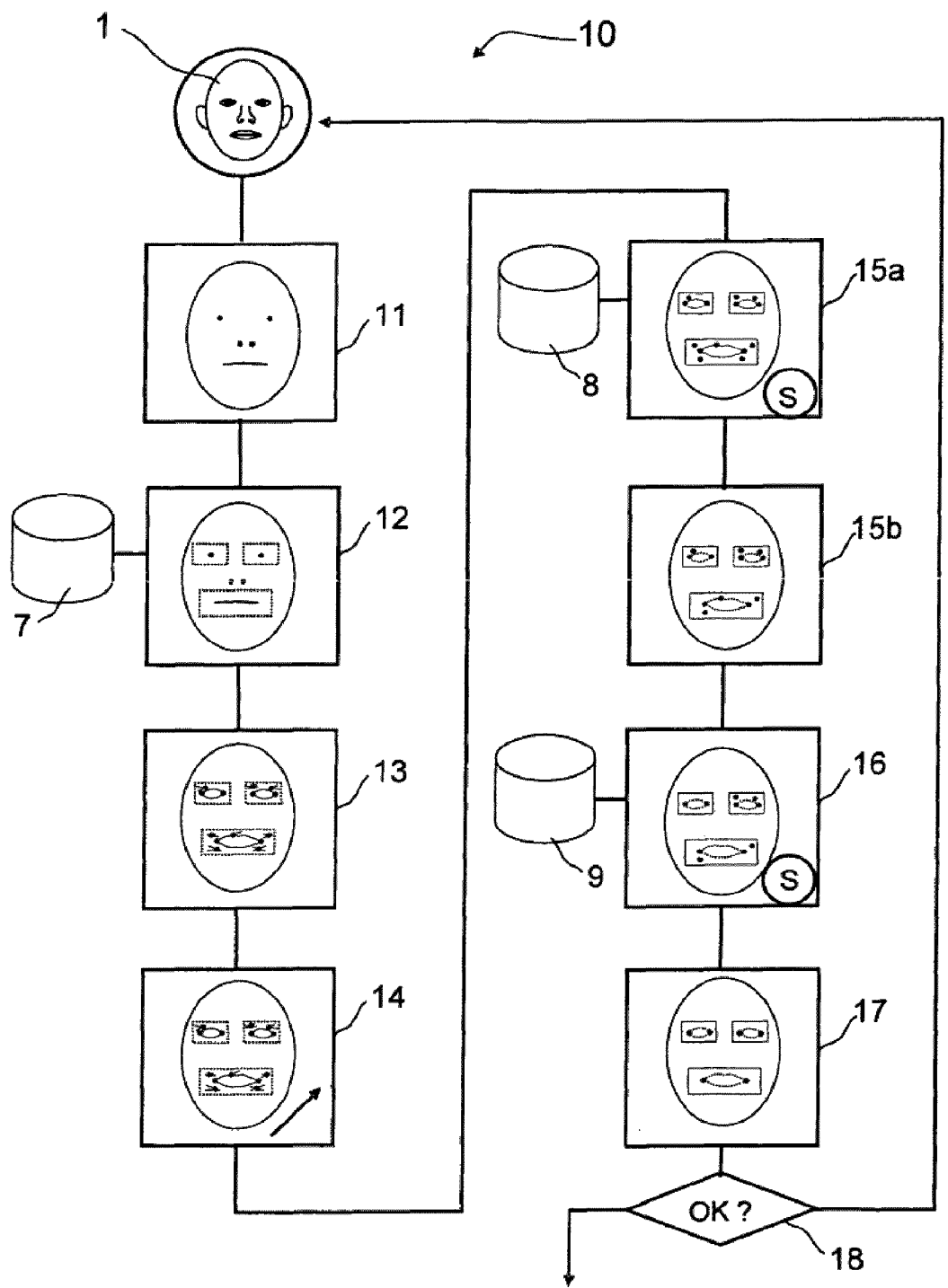

The present invention belongs to the field of the monitoring of a person's vigilance and of his zones of interest during an activity such as the driving of a vehicle. More particularly the invention relates to a method intended to recognize on a face a series of particular points so as to be able in a subsequent step to ensure tracking thereof.

To monitor the vigilance of a person and of his zones of interest, one procedure consists in observing this person's face by means of a camera delivering an image, analysis of which makes it possible to identify movements like those of the head, eyes and eyelids and to deduce therefrom the direction in which the filmed person is looking and with what attentiveness.

It is known to use for this purpose one or more video cameras and to subject the electronic images delivered by these cameras to digital processing so as to extract the sought-after information therefrom.

When this information has to be obtained very rapidly, in an almost instantaneous manner often termed real-time, it is necessary to use powerful and expensive means of generating and processing images so as to solve algorithms which are often complex and have to be executed a large number of times within the framework of this type of processing.

Such means, though they are generally used without reserve for research requirements or within the framework of human activities conducted on complex, expensive or sensitive systems, for example in the aeronautical sector or the nuclear sector, turn out to be unacceptable for use on mass-market systems, such as automobiles, in which the retail price is an essential criterion and cost cutting is always sought.

To reduce the prices of such systems it is then necessary to use on the one hand low-cost imaging systems, in particular low-resolution monochrome cameras, and to limit the image processing procedure to what is strictly necessary. These choices then give rise to losses of performance as regards precision, the ability to follow faster or slower movements, and also as regards the time required to initialize the systems implementing these devices.

The specific objective of the present invention is to identify, in the course of a step of initializing a system for tracking the movements of a face, particular points of the face in a reliable manner, so that the displacements of these particular points in successive images of the face can in a subsequent step be tracked and measured, particularly adapted to a device using simple and inexpensive image acquisition and processing means.

In order to limit the volume of the processing to be carried out to identify symbolic points on the image of a face, said image comprising a priori the images of a right eye, of a left eye and of a mouth, the method successively comprises the steps of:

a) detecting elements with strong contrasts of the face and identifying these elements;

b) selecting at least one zone of the image situated with respect to the elements with strong contrasts and of dimensions such that it contains a priori two sought-after symbolic points interrelated by a morphological criterion;

c) searching, in the zone considered, for points defined by the convergence of separation lines of contrasted zones of the image, termed natural points;

d) determining a signature for each of said natural points by calculating the gradient of the image contrast around the natural point;

e) determining for each natural point at least one score characterizing a resemblance of the signature of the point with respect to pre-established signatures of symbolic points and selecting the natural points having a score above a threshold value;

f) from among the natural points of the zone whose scores are above a threshold value, identifying pairs of natural points, each pair being determined by a first natural point and by a second natural point whose relative position in the zone considered with respect to the first natural point corresponds to a position close to pre-established relative positions of pairs of standard symbolic points searched for in the zone and determining for each identified pair a score characteristic of the deviation of the pair with respect to the pairs of standard symbolic points;

g) in the zone considered, selecting the pair of natural points having the best score as symbolic points of said zone of the image of the face.

Advantageously, the irises of the eyes and/or the nostrils and/or the mouth are used on the image of the face as elements with strong contrasts.

Because of their relatively constant morphological features from one face to another, the image zones selected are determined so as to correspond to a zone overlapping the right eye and/or to a zone overlapping the left eye and/or to a zone overlapping the mouth.

In this case, preferably, the pair of symbolic points searched for in a zone overlapping an eye is determined by points corresponding to the convergence of natural lines consisting of an edge of an upper eyelid and of an edge of a lower eyelid of the eye, and the pair of symbolic points searched for in a zone overlapping the mouth is determined by points corresponding to the convergence of natural lines consisting of an edge of an upper lip and of an edge of a lower lip of the mouth.

Because of the substantially symmetric form of each eye and of the mouth, the zones are selected in such a way that, in each zone, the pre-established relative positions of pairs of standard symbolic points preferably correspond to a symmetric arrangement of the standard symbolic points with respect to a reference line of the zone considered.

Advantageously, to limit the calculation power necessary for processing the images, the image of the face is obtained on the basis of a digital image with low resolution, preferably fewer than 500 lines of 500 image points, produced in the near infrared for a better contrast of the forms and elements observed on the image.

Figure 2:
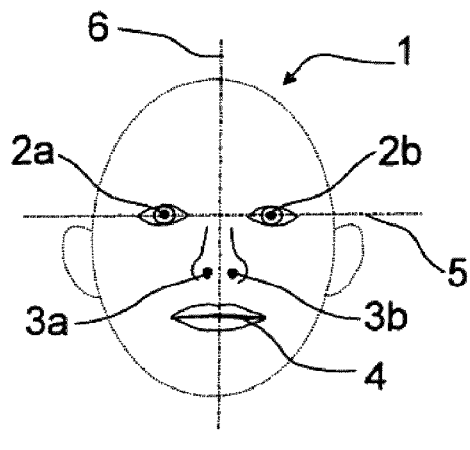
Figure 3:
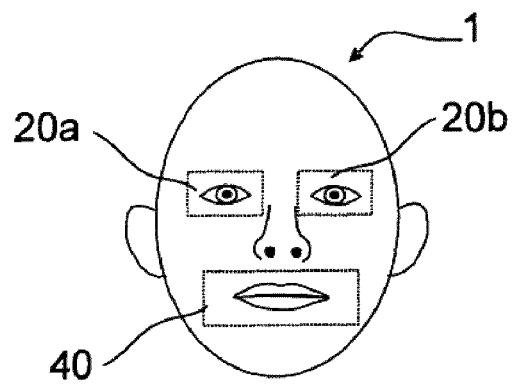
Figure 4:
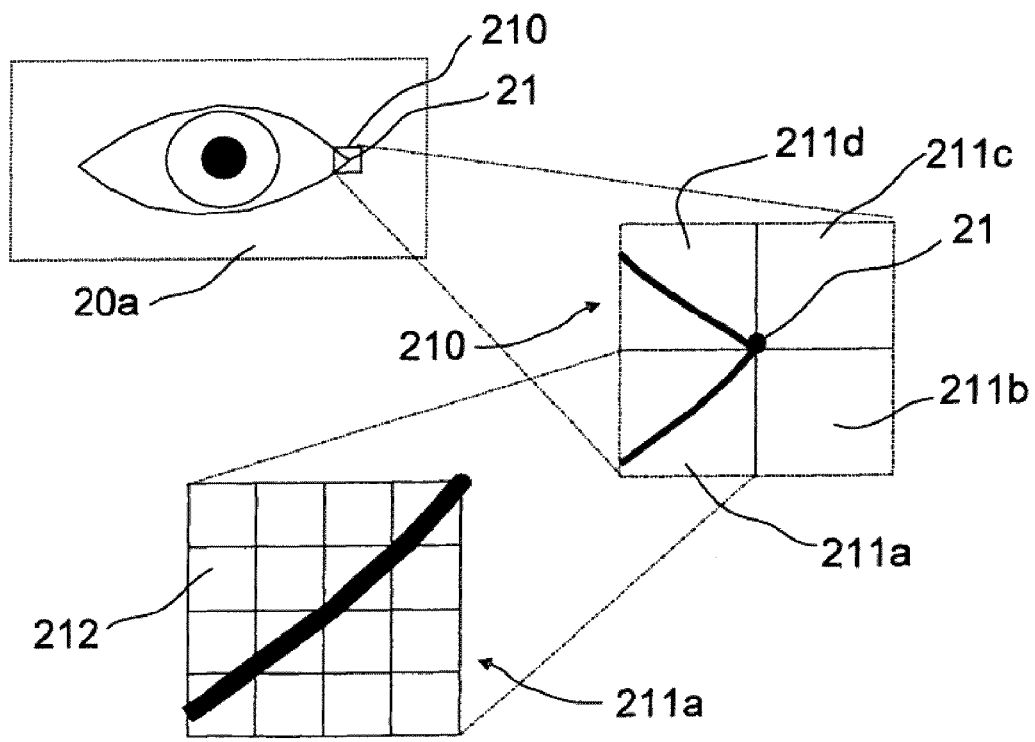

The detailed description of an embodiment is given with reference to the figures which represent:

FIG. 1: a schematic view of the steps of the method in accordance with the invention;

FIG. 2: a schematic representation of elements with strong contrasts of an image of a human face;

FIG. 3: an illustration of the zones of the image of a human face in which symbolic points are searched for;

FIG. 4: an illustration of an exemplary procedure for identifying a natural point.

A method for initializing a system for tracking the face of a person in accordance with the invention consists in identifying a series of particular points, termed symbolic points, on an image of a face 1.

These symbolic points are chosen from among points of the image, termed natural points, which correspond to points of convergence of lines separating contrasted zones of the image.

The expression contrasted zone of the image should be understood to mean contiguous zones of the image whose respective densities are sufficiently different to make it possible to determine a theoretical line of separation of the two zones.

According to the method, at least four and preferably six symbolic points are searched for. Four points are in theory sufficient to carry out tracking of the displacements of the face but in practice six points are desirable to obtain quality tracking, in particular because of head movements of the person which may lead to an image of the face in which certain zones around symbolic points have become non-visible or very difficult to analyze. Said symbolic points of the face each correspond to a point of convergence of the lines formed by edges of the eyelids of an eye or by edges of the lips of the mouth.

The steps of the method 10 are shown schematically in the diagram of FIG. 1.

To search for the symbolic points, a first step 11 consists in detecting elements that are highly contrasted on an image of the face 1 and which make it possible to define an approximate position of said face in the image and in determining the location of image zones in which the symbolic points searched for must logically be situated.

Advantageously, the images of the irises 2a, 2b of the eyes and/or of the mouth 4 and/or of the nostrils 3a, 3b whose forms and contrasts, in particular when the images are produced in the near infrared, make it possible to detect them and to identify them without any particular problem on an image, despite their variable dimensions and forms, are used as highly contrasted elements.

The position in the image of these contrasted elements determines a general reference frame of the face comprising a first axis 5 passing through the centers of the irises 2a, 2b of the eyes, termed the horizontal axis, and a second axis 6 perpendicular to the horizontal axis substantially equidistant from the irises 2a, 2b and/or nostrils 3a, 3b, termed the axis of symmetry of the face.

In a second step 12, the contrasted elements identified are associated with anthropometric data 7 relating to human faces and are used to define zones, termed search zones, for example a zone 20a for the right eye, a zone 20b for the left eye and a zone 40 for the mouth, in which search zones the symbolic points searched for must be situated with a probability close to unity. Each zone is chosen to be sufficiently extensive as to be almost certain of the presence of the symbolic points searched for in said zone and to have the smallest dimensions possible so as to limit the digital processing corresponding to the search for natural points.

In practice, the dimensions of the search zones are determined as a function of the dispersion of the chosen anthropometric data. If the population having to use the device is very homogeneous, the search zones will have small dimensions and, conversely, if the population is very heterogeneous, for example children and adults, they will have bigger dimensions.

In a third step 13, the image is analyzed in each search zone so as to identify all the detectable natural points included in this zone, that is to say points which initially can be considered to be potentially sought-after symbolic points.

Such a search for natural points is for example carried out by following the procedure proposed in the patent application published under the number WO90/14634, in which procedure the image consists of elementary points or pixels and in which the intensity of each pixel is compared with those of the neighboring pixels so as to identify whether the pixel is of the type belonging to an edge or to an angle.

In a fourth step 14, each point identified as a natural point is characterized as a function of at least one value of a quantity characteristic of a gradient of the image contrast around said natural point and said value is compared with previously established reference signatures so as to determine a signature of the point considered.

A procedure, shown schematically in FIG. 4, for calculating a contrast gradient at a point 21 of an image consists for example in considering four zones 211a, 211b, 211c and 211d contiguous with the point 21 to be characterized.

Advantageously, these four zones 211a, 211b, 211c and 211d correspond to zones determined in a square 210 of the image by the perpendicular bisectors of the sides of said square, centered on the point to be characterized, and each itself consisting of several distinct elements 212 of the image, several pixels of a digitized image, advantageously 16 pixels, so that, for each zone 211a, 211b, 211c and 211d, it is possible to calculate a first vector characterizing the contrast gradient of said zone. The combination of the vectors of the four zones 211a, 211b, 211c and 211d around the natural point to be characterized makes it possible to determine a signature of said natural point by four principal directions of the contrast gradient.

For example, a known procedure for determining a contrast gradient in an image around a point is described in U.S. Pat. No. 6,711,293 applied to the identification of scale-invariant elements of an image more generally known as the SIFT algorithm (Scale-Invariant Feature Transform).

In a fifth step 15, the signature of each natural point is compared with reference signatures 8 corresponding to signatures of symbolic points similar to the points searched for in the zone in which the natural point considered is situated.

This comparison determines a score of the natural point which is dependent on deviations between the signature of said natural point and the reference signature or signatures. The smaller the deviations between the signature of the natural point and the reference signature of a given symbolic point, the higher the score of the natural point and the greater the probability that the natural point corresponds to the symbolic point with which the signature is compared. The natural points exhibiting a sufficiently high score, for example greater than a predetermined minimum score, are then selected 15b for the following step.

In a sixth step 16, the natural points selected during step 15b are associated in pairs. A pair is formed of a first natural point of a zone with a second natural point of the same zone, which point is chosen as the natural point closest to the theoretical position, relative with respect to the first natural point, established on the basis of an anthropometric database 9, of a point corresponding to a second symbolic point if the first point was also a symbolic point.

A procedure for obtaining this result consists in considering as theoretical position for the search for the second, closest, point a position corresponding to the point of symmetry of the first natural point with respect to an axis of symmetry of the zone substantially parallel to the axis 6 of symmetry of the face. The use of this particular procedure assumes that the zone considered is placed on the image in such a way that its axis of symmetry is substantially on the axis of symmetry of the corresponding part of the face, for example for the right eye, the zone 20a has substantially entered on the image of the iris 2a.

A combined score is then allotted to each pair of points, said combined score being obtained through a combination of the scores of each of the two points of the pair and of the quality of the symmetry of said points, for example a deviation of their distances to the axis of symmetry from the zone and/or a deviation of their positions in the direction of the axis of symmetry of the face 6 with respect to the horizontal axis 5.

In a seventh step 17, the pairs having obtained the best combined score for each pair of symbolic points searched for are retained as corresponding to the points identifying the symbolic points.

In a preferred implementation of the method six symbolic points of a human face are defined as being:

for the right eye:
the outer corner of the eye or ROC, corresponding to a junction of the upper and lower eyelids;
the inner corner of the eye or RIC;

for the left eye:
- the outer corner of the eye or LOC;
- the inner corner of the eye or LIC;

for the mouth:
- the left corner of the mouth or LMC, corresponding to a junction of the upper and lower lips;
- the right corner of the mouth or RMC.

A first zone 20a is defined as being the zone around the right eye or REZ, a second zone 20b is defined as being the zone around the left eye or LEZ and a third zone 40 is defined as being the zone around the mouth or MZ.

In an embodiment of a device for the implementation of the method, the use of a low-resolution black and white video camera, giving digital images of a few hundred lines each comprising a few hundred pixels, has shown that during the third step 13 of the method, about 20 to 50 natural points are identified in each zone.

On completion of the fifth step 15 of the method, two to six natural points in each zone have a sufficient score to be retained as candidates as symbolic points from among which the sixth step 16 makes it possible to select in each zone REZ, LEZ and MZ a pair of points, respectively (ROC-RIC), (LOC-LIC) and (RMC-LMC), corresponding to the symbolic points searched for with an extremely small probability of error.

Under the assumption 18 that certain symbolic points searched for will not have been identified, the identification process is recommenced with a new image 1 until the position of the face in the image makes it possible to detect all the symbolic points searched for.

The proposed method thus makes it possible, while maintaining adequate performance, to simplify the process of preliminary identification of the symbolic points of the image of a face given by an imaging system of limited performance so as to be able to carry out subsequent tracking of the movements of the face.

The invention claimed is:

1. A method (10) for identifying symbolic points on the image of a face (1), said image comprising a priori the images of a right eye, of a left eye and of a mouth, said method successively comprising the steps of:
   a) detecting (11) elements (2a, 2b, 3a, 3b, 4) with strong contrasts of the face and identifying said elements with strong contrasts;
   b) selecting (12) at least one zone (20a, 20b, 40) of the image, said at least one zone having a position and dimensions on the image (1) that are determined with respect to the elements with strong contrasts (2a, 2b, 3a, 3b, 4) and such that it contains a priori two sought-after symbolic points interrelated by a morphological criterion;
   c) searching (13) for points defined by the convergence of separation lines of contrasted zones of the image, termed natural points, in said at least one zone;
   d) determining (14) a signature for each of said natural points by calculating the gradient of the image contrast around the natural point;
   e) determining (15a) for each natural point at least one score characterizing a resemblance of the signature of the point with respect to pre-established signatures of symbolic points and selecting (15b) the natural points having a score above a threshold value;
   f) from among the natural points of the at least one zone whose scores are above a threshold value, identifying (16) pairs of natural points, each pair being determined by a first natural point and by a second natural point whose relative position in the zone considered with respect to the first natural point corresponds to a position close to pre-established relative positions of pairs of standard symbolic points searched for in said at least one zone and determining for each identified pair a score characteristic of the deviation of the pair considered with respect to the pairs of standard symbolic points;
   g) in the at least one zone, selecting (17) the pair of natural points having the best score as symbolic points of said at least one zone considered of the image of the face (1).

2. The method as claimed in claim 1 in which the elements with strong contrasts (2a, 2b, 3a, 3b, 4) of the face are chosen from among irises of the eyes, nostrils and the mouth.

3. The method as claimed in claim 1 in which the selection (12) of the zones (20a, 20b, 40) of the image is determined so as to correspond to a zone overlapping the right eye and/or to a zone overlapping the left eye and/or to a zone overlapping the mouth.

4. The method as claimed in claim 3 in which the pair of symbolic points in a zone overlapping an eye is searched for (16) by the identification of the convergence of natural lines consisting of an edge of an upper eyelid and of an edge of a lower eyelid of the eye.

5. The method as claimed in claim 3 in which the pair of symbolic points in a zone overlapping the mouth is searched for (16) by the identification of the convergence of natural lines consisting of an edge of an upper lip and of an edge of a lower lip of the mouth.

6. The method as claimed in claim 1 in which the zones (20a, 20b, 40) are selected in such a way that, in each zone, the pre-established relative positions of pairs of standard symbolic points (9) correspond to a symmetric arrangement of the standard symbolic points with respect to a reference line of the zone considered.

7. The method as claimed in claim 1 in which the image of the face (1) is obtained from a digital image with low resolution, preferably fewer than 500 lines of 500 image points.

8. The method as claimed in claim 7 in which the digital image is produced in the near infrared.

9. The method as claimed in claim 2 in which the selection (12) of the zones (20a, 20b, 40) of the image is determined so as to correspond to a zone overlapping the right eye and/or to a zone overlapping the left eye and/or to a zone overlapping the mouth.

10. The method as claimed in claim 9 in which the pair of symbolic points in a zone overlapping an eye is searched for (16) by the identification of the convergence of natural lines consisting of an edge of an upper eyelid and of an edge of a lower eyelid of the eye.

11. The method as claimed in claim 4 in which the pair of symbolic points in a zone overlapping the mouth is searched for (16) by the identification of the convergence of natural lines consisting of an edge of an upper lip and of an edge of a lower lip of the mouth.

12. The method as claimed in claim 10 in which the pair of symbolic points in a zone overlapping the mouth is searched for (16) by the identification of the convergence of natural lines consisting of an edge of an upper lip and of an edge of a lower lip of the mouth.

* * * * *